(12) United States Patent  
Sprunk

(10) Patent No.: US 7,787,622 B2
(45) Date of Patent: Aug. 31, 2010

(54) EFFICIENT DISTRIBUTION OF ENCRYPTED CONTENT FOR MULTIPLE CONTENT ACCESS SYSTEMS

(75) Inventor: Eric Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 1630 days.

(21) Appl. No.: 10/712,427

(22) Filed: Nov. 13, 2003

(65) Prior Publication Data

US 2004/0123094 A1 Jun. 24, 2004

Related U.S. Application Data

(60) Provisional application No. 60/425,802, filed on Nov. 13, 2002.

(51) Int. Cl.
*H04K 1/06* (2006.01)
*G06F 12/14* (2006.01)

(52) U.S. Cl. .......................... 380/37; 713/193
(58) Field of Classification Search ............. None
See application file for complete search history.

(56) References Cited

U.S. PATENT DOCUMENTS 5,864,747 A * 1/1999 Clark et al. ................ 725/67

7,177,427 B1 * 2/2007 Komuro et al. ............ 380/239
2001/0028725 A1 * 10/2001 Nakagawa et al. ........ 382/100
2002/0090090 A1 * 7/2002 Van Rijnsoever et al. ... 380/279
2002/0129243 A1 * 9/2002 Nanjundiah ............... 713/160

FOREIGN PATENT DOCUMENTS

EP          0 696 141 A    2/1996
WO      WO 96/08912 A    3/1996

* cited by examiner

*Primary Examiner*—Brandon S Hoffman
(74) *Attorney, Agent, or Firm*—Larry T. Cullen

(57) ABSTRACT

A system and method for digital data distribution is disclosed. The system and method provides a set of one or more source streams encoded by an encoder to form a common data stream for distribution to a plurality of destination systems, each authorized to access at least a portion of the common data stream. Encryption comprises obtaining the source stream, identifying some blocks of the source stream as secure blocks, identifying some other blocks of the source stream as unsecured blocks, encrypting the secure blocks for each of a plurality of destination system classes wherein each of the plurality of destination systems is a member of one or more destination system classes, and each of the blocks of an encrypted secure block set is decryptable by destination systems in the class associated with that encrypted secure block set.

26 Claims, 5 Drawing Sheets

FIG. 6 - PRIOR ART -

CA(1) ENCRYPTED PACKETS -TYPICAL-

| VIDEO | PKT1 | PKT2 | PKT3 | PKT4 | PKT5 | PKT6 | PKT7 | PKT8 | PKT9 |
|---|---|---|---|---|---|---|---|---|---|
| AUDIO |  | PKT1 | PKT2 |  |  |  | PKT3 | PKT4 |  |
| CA1 ECMs | PKT1 |  |  | PKT2 |  |  | PKT3 |  |  |
| CA2 ECMs | PKT1 |  |  | PKT2 |  |  | PKT3 |  |  |

FIG. 7 - PRIOR ART -

CA(1) ENCRYPTED PACKETS -TYPICAL-

| CA1 VIDEO | PKT1 | PKT2 | PKT3 | PKT4 | PKT5 | PKT6 | PKT7 | PKT8 | PKT9 |
|---|---|---|---|---|---|---|---|---|---|
| CA1 AUDIO |  | PKT1 | PKT2 |  |  |  | PKT2 | PKT4 |  |
| CA1 ECMs | PKT1 |  |  | PKT2 |  |  | PKT3 |  |  |

CA(2) ENCRYPTED PACKETS -TYPICAL-

| CA2 VIDEO | PKT1 | PKT2 | PKT3 | PKT4 | PKT5 | PKT6 | PKT7 | PKT8 | PKT9 |
|---|---|---|---|---|---|---|---|---|---|
| CA2 AUDIO |  | PKT1 | PKT2 |  |  |  | PKT3 | PKT4 |  |
| CA2 ECMs | PKT1 |  |  | PKT2 |  |  | PKT3 |  |  |

FIG. 8

| CA1 & CA2 VIDEO | PKT1 | PKT2 | PKT3 | PKT4 | PKT5 | PKT6 | PKT7 | PKT8 |  |
|---|---|---|---|---|---|---|---|---|---|
| CA1 & CA2 AUDIO |  | PKT1 | PKT2 |  |  | PKT3 |  |  |  |

CA(1) ENCRYPTED PACKETS -TYPICAL-

| CA1 VIDEO |  |  |  |  |  |  |  |  | PKT9 |
|---|---|---|---|---|---|---|---|---|---|
| CA1 AUDIO |  |  |  |  |  |  | PKT4 |  |  |
| CA1 ECMs | PKT1 |  |  | PKT2 |  |  | PKT3 |  |  |

CA(2) ENCRYPTED PACKETS -TYPICAL-

| CA2 VIDEO |  |  |  |  |  |  |  |  | PKT9 |
|---|---|---|---|---|---|---|---|---|---|
| CA2 AUDIO |  |  |  |  |  |  | PKT4 |  |  |
| CA2 ECMs | PKT1 |  |  | PKT2 |  |  | PKT3 |  |  |

EFFICIENT DISTRIBUTION OF ENCRYPTED CONTENT FOR MULTIPLE CONTENT ACCESS SYSTEMS

CROSS-REFERENCE TO RELATED APPLICATION

This application is related to U.S. Provisional Patent Applications No. 60/425,802 filed on Nov. 13, 2002 from which priority is claimed.

FIELD OF THE INVENTION

The present invention relates to digital data distribution networks. More specifically, the present invention relates to conditional access distribution systems.

BACKGROUND OF THE INVENTION

Conditional access ("CA") generally refers to a system which permits data to be propagated pervasively through a network, and where destination systems, on the network, are selectively given access to all, or portions of, the propagated data. For example, a conditional access system ("CAS") is conventionally used in the distribution of digital cable television signals. In a digital cable television distribution system, a signal, containing the data, is received at a broadcast center, encoded and broadcasted to a large number of destination systems. The destination systems often include set-top boxes located near a cable television subscriber's television/display, or more remote from the end-user in the broadcast path. Preferably, the signal is secured so that it is not readily usable by an unauthorized end-user, but is usable by only authorized end-users. An unauthorized end-user might be someone who has added hardware to an existing cable system to obtain service where no service is ordered or might simply be a valid subscriber that is not subscribing to a particular portion of the content distributed over the digital cable system.

One conventional approach to distributing signals over a digital cable system is to receive as inputs a set of one or more programs or streams representing video channels. Such streams might be encoded using MPEG encoding and a single television program might comprise more than one "elementary stream," where an elementary stream is the coded representation of a single video, audio or other data stream that shares a common time base of the program of which it is a member.

One conventional approach to securing signals over the cable television system is to encrypt the elementary streams such that they can only be easily decrypted by an authorized decoder at a end-user receiving end. This can be done, for example, by encrypting the broadcast streams using a symmetric key and providing the symmetric key to each of the authorized end-user decoders, such as over an out-of-band channel or using one of the many key distribution schemes known in the art.

Such a system works well when all of the decoders utilize the conditional access system, such as where the cable distribution system is used by a single provider to provide signals to its customers and all of the decoders are in the hands in the provider's customers. The problem is more difficult when multiple conditional access systems are sharing the same network. In a simple approach to sharing a network among multiple conditional access systems, each broadcaster could independently encode its content streams and deliver them to the various end-users in, for example, a multiplexed fashion. This approach is acceptable where the different broadcasters are broadcasting unrelated content, but where the source signal, such as television signals to be broadcasted, are the same over the various conditional access systems, it is clear that considerable network bandwidth would be required, since bandwidth requirements for any given set of programs would be approximately the bandwidth required for distributing the programs times the number of conditional access systems sharing the cable network.

One traditional way of distributing content over a network shared among more than one conditional access system is the system described above, often referred to as "multicrypt" where all the source data is sent multiple times, with each iteration encrypted for one of the conditional access systems. An approach to this problem that reduces bandwidth use is the "simulcrypt" approach, wherein the streams to be protected are encrypted one time, and the decryption keys needed to decrypt the one set of streams is shared among the conditional access systems. While this saves bandwidth, it introduces additional complications, such as the need to facilitate key sharing and to solve the resultant key protection problems as well.

What is needed is a system and method to provide end-users with an intermediate option for providing desired program content utilizing multiple condition access systems.

SUMMARY OF INVENTION

An object of the present invention is to provide a system and method for the use of a plurality of conditional access systems on a common data network, where each conditional access system can be independently controlled by each of the conditional access operators, without requiring coordination among conditional access operators, and without requiring an entire bandwidth allocation for each conditional access operator.

In order to achieve these objectives, as well as others which will become apparent in the disclosure below, in one exemplary embodiment the present invention provides for a distribution system where a set of one or more source (elementary) streams is encoded by an encoder to form a common data stream for distribution to a plurality of destination systems, each authorized to access at least a portion of the common data stream, comprising (1) obtaining the source stream, (2) identifying some blocks of the source stream as secure blocks, (3) identifying some other blocks of the source stream as unsecured blocks, (4) encrypting the secure blocks for each of a plurality of destination system classes (e.g., conditional access systems) wherein each of the plurality of destination systems is a member of one or more destination system class, and each of the blocks of an encrypted secure block set is decryptable by destination systems in the class associated with that encrypted secure block set.

A further understanding of the nature and advantages of the inventions disclosed herein may be realized by reference to the remaining portions of the specification and the attached drawings.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein:

FIG. 6 illustrates results of a conventional simulcrypt operation;

FIG. 7 illustrates the results of a conventional multicrypt operation;

FIG. 8 illustrates results of one exemplary embodiment of a selective multiple encryption process of the present invention;

DESCRIPTION OF A PRESENTLY PREFERRED EMBODIMENT

Figure 1:
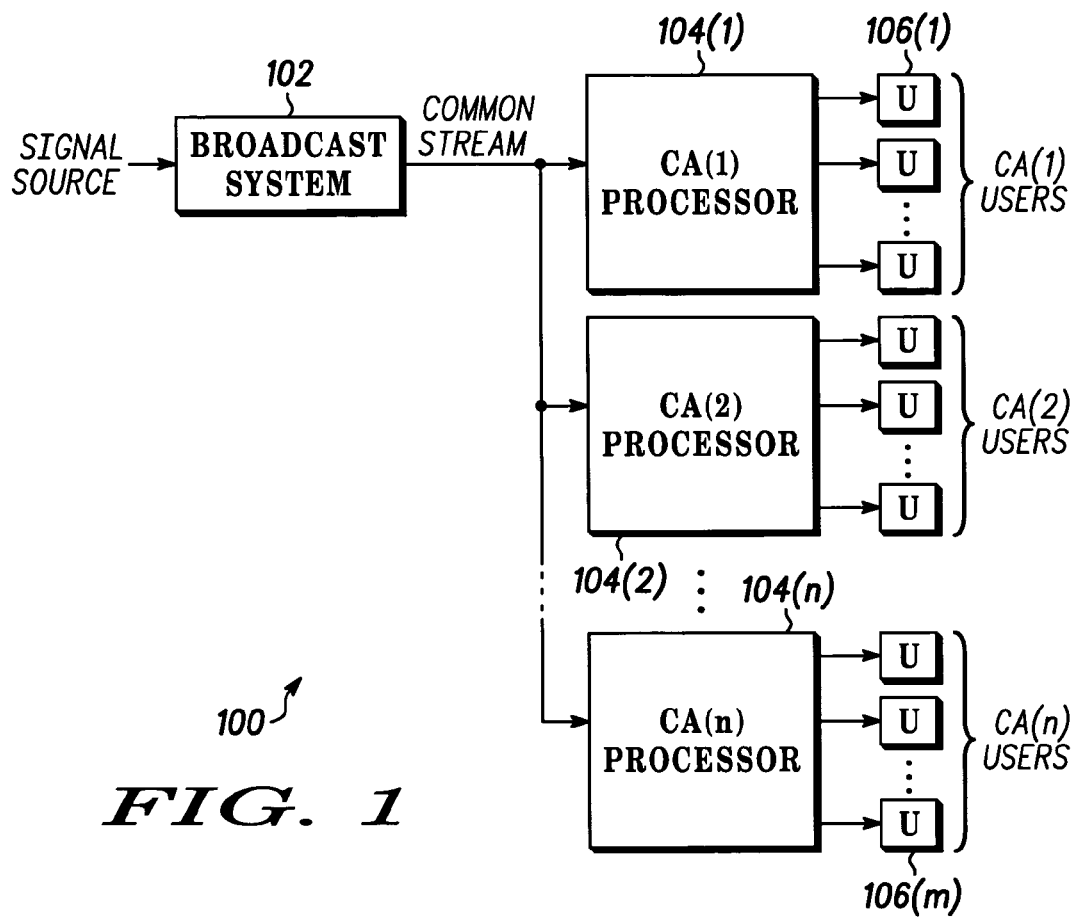
FIG. 1 is a block diagram of a signal distribution system in accordance with an exemplary embodiment of the present invention.

Referring to FIG. 1, in an exemplary embodiment, the present invention includes a distribution system, wherein a signal source is input to a broadcast system 102 and subsequently conveyed via CA processors 104 to end-user devices 106, e.g., set-top box, etc. Broadcast system 102 is capable of outputting a common stream usable by each of the CA processors 104. As used herein, "n" refers to the number of conditional access systems served by the broadcast system. In some instances, n equals 2 while in other instances n is 3 or more. Each end-user device 106 receives the broadcast signal from its corresponding CA processor 104. As shown in FIG. 1, each CA processor 104 can provide a signal to any number of end-user devices 106. As used herein, "m" refers to the number of end-user devices 106 provided with signals. It should be understood that the signal provided could be a single program, such as a video and audio presentation, and that the broadcast system might support multiples of such programs.

In practice, each CA processor 104 is operated and/or controlled by an entity that might be independent of the entities operating/controlling the other CA processors. In this manner, independent entities can support separate sets of end-user devices 106, providing each of their separate sets of end-user devices 106 with a signal corresponding to the signal provided to broadcast system 102. As explained in more detail below, each CA processor 104 can perform the necessary provision of signal using the common stream provided by broadcast system 102. For example, CA processor 104(1) might decrypt a signal from a common stream and provide that decrypted signal to its end-user devices 106, while CA processor 104(2) does a similar decryption for its end-user devices 106, respectively.

Figure 2:
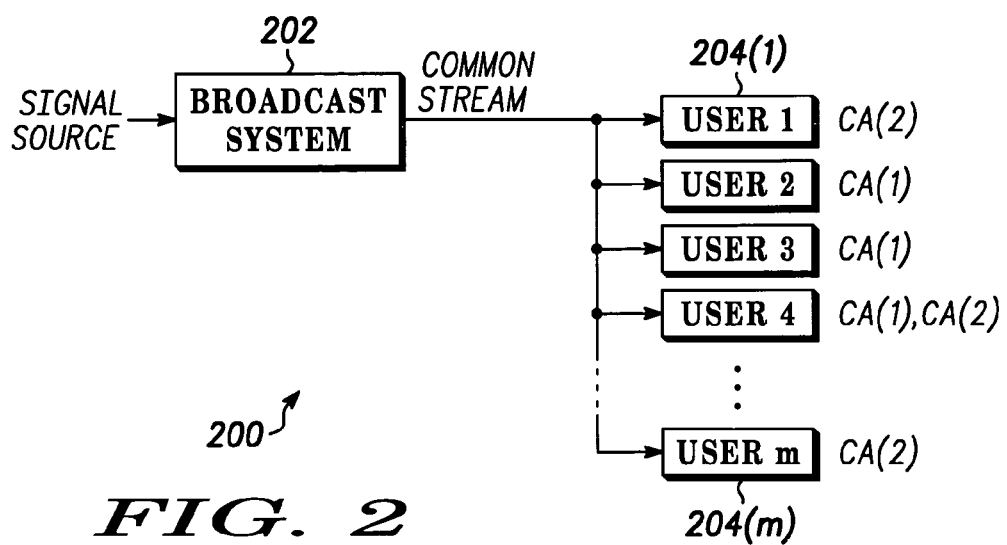
FIG. 2 is a block diagram of a variation of a signal distribution system in accordance with an exemplary embodiment of the present invention.

FIG. 2 illustrates a variation of a distribution system 200, wherein a broadcast system 202 receives a signal source and processes it to form a common stream that is in turn distributed to a plurality of end-user systems 204. In this arrangement, the processing that would have been necessary in the CA processors 104, shown in FIG. 1, is instead incorporated into each of the end-user devices 204. The conditional access system/class of the CA processor 104, whether external or internal, for a respective end-user device 204 is also referred to herein as the "native" conditional access system/class of that end-user device 204. Note that, as illustrated, each end-user devices 204 need not be limited to one conditional access system. For example, FIG. 2 illustrates end-user devices 204 that are associated with conditional access systems CA(1) and CA(2), with end-user device 204(4) being associated with both conditional access systems. In this instance end-user device 204(4) has two native conditional access systems, see above.

Figure 3:
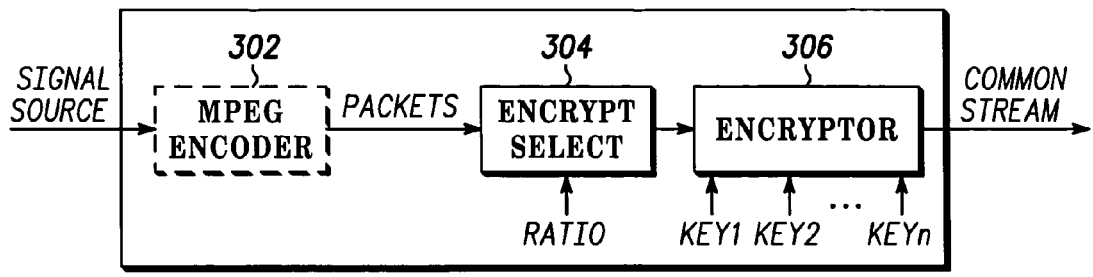
FIG. 3 is a block diagram showing an encryption stream processor in accordance with an exemplary embodiment of the present invention.

FIG. 3 shows an encryption processor system 300, as might be used in the broadcast systems in previous figures to generate a common stream from a source stream. In this exemplary embodiment, the stream is assumed to be a video stream and the encryption processor 300 includes an MPEG encoder 302 that packetizes the video stream, an encryption selector 304 which selects packets to be encrypted, and an encryptor 306 that encrypts the selected packets and forms the common stream that is to be broadcast. In some embodiments, the packets are formed around video and/or audio frames such that each packet codes for one frame.

In some cases, the sources are ready-encoded as MPEG data and MPEG encoder 302 is not needed. Encryption selector 304 identifies packets as either being secure packets or unsecure packets. A control parameter might be provided to encryption selector 304 to indicate a desired ratio of secure packets to unsecure packets. By suitable selection of the packets to be encrypted, the ratio could be as low as one secure block for every thousand unsecure blocks and still be such that any useful decoding of the result could not be done without decrypting at least some of the secured blocks. As illustrated in FIG. 8, encryptor 306 encrypts the selected secure blocks using each of the keys provided to it for each of the n conditional access systems, such that the common stream comprises the unsecured packets and a plurality of encrypted versions of the secured packets, each encrypted by the key for one of the conditional access systems.

Figure 4:
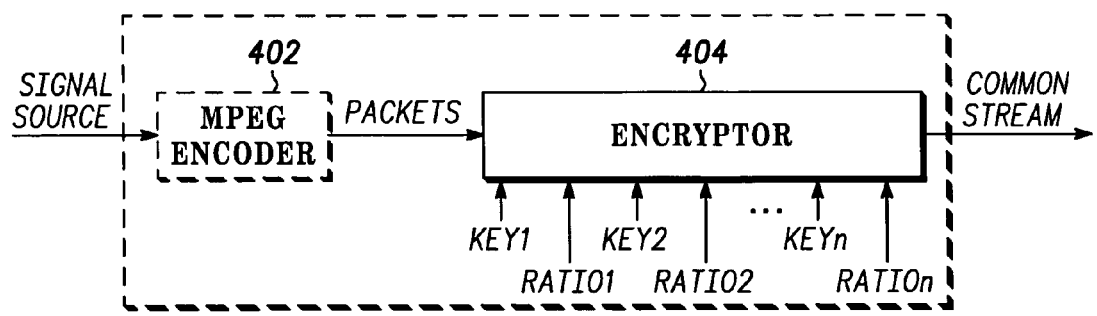
FIG. 4 is a block diagram of a variation of an encryption stream processor in accordance with an exemplary embodiment of the present invention.

FIG. 4 illustrates a variation (another exemplary embodiment) of the encryption processor system shown in FIG. 3. Encryption processor 300 operates on a ratio control signal provided to encryption selector 304. However, in the variation shown in FIG. 4 of encryption processor system 400, the output of an MPEG encoder 402 (if used) is provided to an encryptor 404, which performs the selection process. Encryptor 404 receives a key for each of the CASs to be supplied and in addition receives a ratio control signal that can be different for each CASs. In this example, the same encryption algorithm might be used for all of the CASs, but in other variations, each CAS can specify and/or provide the encryption algorithm and ratio of secured and unsecured packets for its encryption scheme. In some embodiments, DES (Data Encryption Standard) encryption might be used, while in others AES (Advanced Encryption Standard), triple-DES, Blowfish, Twofish or other algorithms are used. Further, the desired ratio of secure and unsecured packets may differ for each of the above respectively, subject to the basic limitation that each packet is only encrypted once if encrypted at all.

Figure 5:
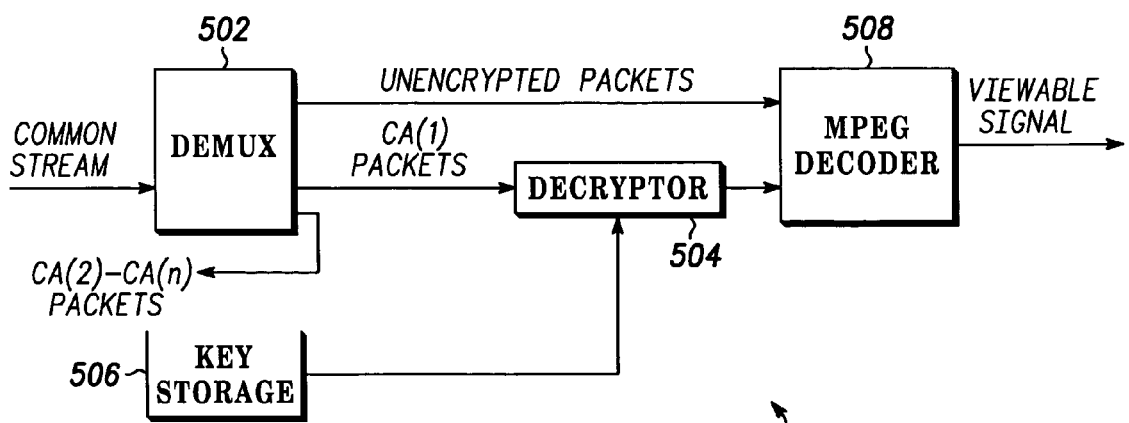
FIG. 5 is a block diagram of a common stream decryption processor in accordance with an exemplary embodiment of the present invention.

FIG. 5 illustrates a decryption processor 500 for a common stream. As used herein, "common stream" is a stream of data (but can also be a block, a file, or the like) representing the signal or signals being distributed in a distribution system where it is contemplated that more than one CA processors, or end-user devices of more than one CAS, will be provided with the common stream. As explained herein, each CAS operator or owner might have an interest in controlling the access of its end-user devices to the signal being distributed without necessarily coordinating actions with other CAS operators or owners. As used herein, "access" might be defined by availability of a signal, but access could also be defined by useful availability of a signal. For example, if an end-user device can receive and play an audio stream, but the errors, encryption, noise, etc. on the signal make it unsuitable for listening without further processing, it can be said that the end-user device does not have access to that signal.

Decryption processor 500 is shown comprising a demultiplexer 502, a decryptor 504, key storage 506, and an MPEG decoder 508. Of the connections shown, the common stream is input to demultiplexer 502. Demultiplexer 502 provides unencrypted packets to MPEG decoder 508 and encrypted CA(1) packets to decryptor 504. In this exemplary embodiment, the decryption processor is for the conditional access system labeled CA(1), decryptor 504 provides decrypted packets to MPEG decoder 508, and key storage 506 provides keys to decryptor 504. In operation, demultiplexer 502 reads the common stream and identifies packets as being (1) unencrypted packets, (2) encrypted packets for a native conditional access system, and (3) encrypted for a foreign conditional access system. In this exemplary embodiment, conditional access system CA(1) is the native conditional access system for decryption processor 500 and all other conditional access systems are foreign access systems for decryption processor 500. In other instances, other conditional access systems would be the native conditional access systems for a decryption processor, and, in some cases, a decryption processor could be native to more than one conditional access system. Generally, a decryption processor is native to a conditional access system if the decryption processor is set up to make useful access of signals provided by that conditional access system and the decryption processor is foreign to those conditional access systems which are not intended to provide signals to that decryption processor.

For those packets that demultiplexer 502 identifies as being unencrypted packets, they are provided to MPEG decoder 508 without requiring any further processing. For those packets that are identified as being encrypted by a native conditional access system, those packets are provided to a decryptor 504, which is able to decrypt those packets using keys available from key storage 506 and provide the decrypted packets to MPEG decoder 508. As explained herein, the common stream is arranged such that packets encrypted for foreign conditional access systems are not needed to produce an accessible system if a decryption processor has at least one native conditional access system providing access to a signal. As explained herein, preferably the packets that are encrypted are at least in part needed by MPEG decoder 508 to produce a viewable signal, thereby providing conditional access to the decryption processor conditioned on at least having a key in key storage 506 for decrypting packets encrypted for a native conditional access system.

Using the elements described above, a common stream can be generated and distributed to processors and/or users of a plurality of conditional access systems and access can be independently controlled by each of the CAS operators without requiring coordination among CAS operators and without requiring an entire bandwidth allocation for each CA operator. This is illustrated in FIGS. 6 and 7, which illustrate previous conventional approaches, discussed above, to accommodating multiple conditional access systems on a distribution system.

FIG. 6 illustrates results of a conventional simulcrypt operation. In that example, a program stream comprises a video stream, an audio stream, and a stream of entitlement control messages (ECM's). The streams are illustrated in time order and it should be understood that the scales between the various streams is not necessarily equal. In the simulcrypt approach, video packets and audio packets are encrypted at the broadcast system, but ECM packets need not be encrypted.

In the case of simulcrypt, or other techniques where the same stream is provided to all end-user devices, in order for the end-user devices to be able to decode the encrypted video and audio streams, the CA operators must coordinate so that each of their end-user devices has available a key for decoding the streams and must further coordinate with the broadcast system such that the corresponding encryption key is available as needed. While this has advantages in that the stream need only be transmitted once, there are disadvantages in that it requires coordination among the conditional access system operators and may allow for an authorized user of one conditional access system to become an unauthorized user of another conditional access system. The storing of keys necessitated by a simulcrypt approach introduces risk in the network, as the means of sharing keys is a target for theft of those keys.

FIG. 7 illustrates a conventional multicrypt operation, which does not necessarily require coordination among conditional access system operators and avoids the issue of whether an end-user device authorized in one conditional access system can access the content provided by another conditional access system to which the end-user devices is not authorized. With multicrypt, this is accomplished by having each conditional access system use a separately encrypted stream. Thus, a conditional access system CA(1) would encrypt the video and audio streams using its keys (and its encryption algorithm, if distinct algorithms are used), while a conditional access system CA(2) would encrypt the same audio and video streams using its keys (and algorithm), and the broadcast would combine these encrypted streams and distribute them. This is undesirable in that the bandwidth required for distribution would be the bandwidth required for one encrypted stream times the number of conditional access systems supported by the distribution system.

As illustrated in FIG. 8, the selective multiple encryption of the present invention overcomes all of the above-described difficulties. Using the present invention, as described in the exemplary embodiments above, much or most of the video and audio stream can be sent in unencrypted (unsecured) form, with the remainder being encrypted by each of the conditional access systems, or by the broadcast using keys provided by each conditional access system. In the illustration of FIG. 8, an encryption processor for a generalized data stream creates the labelled packets. Thus, the first eight video packets are sent unencrypted and thus can be used by any CAS. Likewise, the first three audio packets and the ECM packets are sent unencrypted. As for the ninth video packet and the fourth audio packet, in this example, copies of those are encrypted for each CAS.

Of course, where more than one CA, but less than all CAs, is to access the stream using a common encryption, an encrypted copy for each class of CA is sufficient and an encryption for each CA might not be required. Such an approach wherein some CAs share the common encryption, keys will be shared among the class members, as with simulcrypt, so this might be limited to uses where CAs closely cooperate.

In the example shown, one out of nine video packets is repeated, so the overhead for having multiple CAs is approximately 11% for each additional CA. However, by judicious selection of the packets to encrypt, the overhead can be made much lower and still have the desirable property that the stream is not useful without decrypting the encrypted packets. For example, in an MPEG stream, the I frames might be encrypted or partially encrypted.

Figure 9:
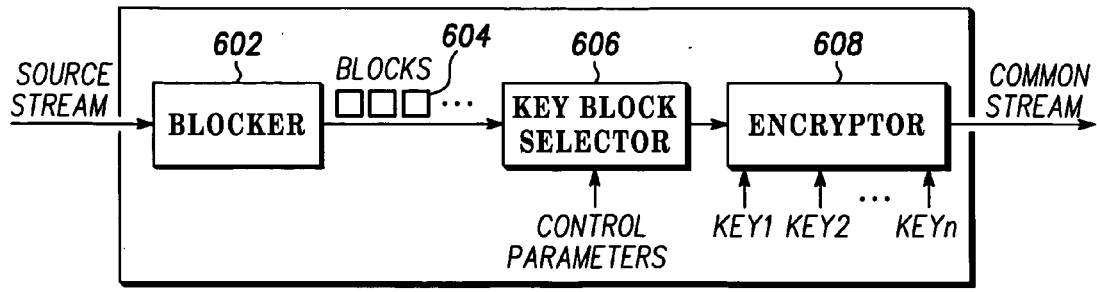
FIG. 9 illustrates an encryption processor for a generalized data stream in accordance with an exemplary embodiment of the present invention.

FIG. 9 illustrates an encryption processor 600 for a generalized data stream. The generalized data stream need not be video, audio, MPEG, etc. Encryption processor 600 is shown comprising a blocker 602 that allocates data from a source stream into blocks 604. Blocks 604 are provided to a key block selector 606 that selects the blocks to be encrypted, based on control parameters provided to key block selector 606. An encryptor 608 encrypts the ones of blocks 604 indicated as being for encryption by key block selector 606. Encryptor 608 is provided by n keys, one for each class of CAS. Note that often each class of CAS will comprise exactly one CAS, but in some distribution systems, a class of CAS will comprise more than one CAS (or zero CASs if there is a need for that). Encryptor 608 outputs a common stream that is provided to a plurality of end-user devices and/or conditional access system processors.

Figure 10:
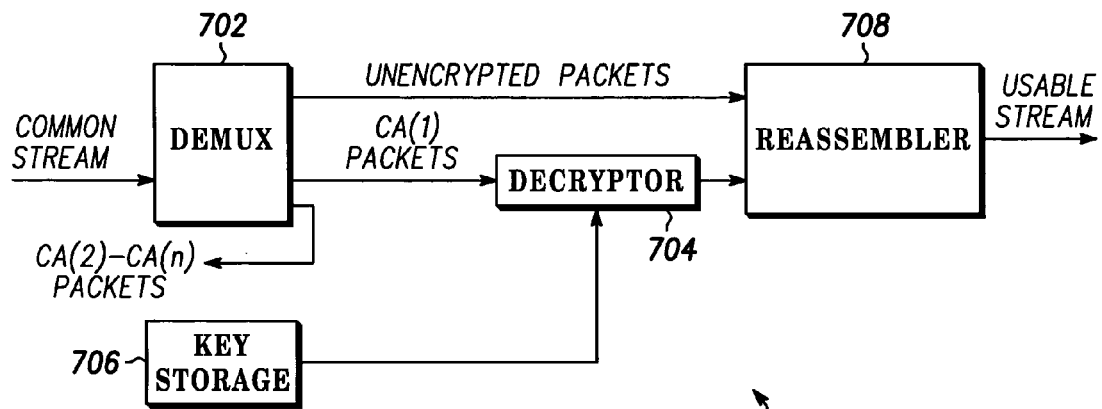
FIG. 10 illustrates a decryption processor for a generalized stream, such as that resulting from the encryption processor shown in FIG. 9.

FIG. 10 illustrates a decryption processor 700 for a generalized stream, such as that resulting from the encryption processor shown in FIG. 9. Decryption processor 700 is shown comprising a demultiplexer 702, a decryptor 704, key storage 706, and a reassembler 708. Of the connections shown, the common stream is input to demultiplexer 702. Demultiplexer 702 provides unencrypted packets to reassembler 708 and encrypted CA(1) packets to decryptor 704 (in this example, the decryption processor is for the conditional access system labeled CA(1), and similar decryption processors might be present for other CASs), decryptor 704 provides decrypted packets to reassembler 708, and key storage 706 provides keys to decryptor 704. In operation, demultiplexer 702 reads the common stream and identifies packets as being (1) unencrypted packets, (2) encrypted packets for a native conditional access system, and (3) encrypted for a foreign conditional access system.

In this example, conditional access system CA(1) is the native conditional access system for decryption processor 700 and all other conditional access systems are foreign access systems for decryption processor 700. In other instances, other conditional access systems would be the native conditional access systems for a decryption processor, and, in some cases, a decryption processor could be native to more than one conditional access system. Generally, a decryption processor is native to a conditional access system if the decryption processor is set up to make useful access of signals provided by that conditional access system and the decryption processor is foreign to those conditional access systems which are not intended to provide signals to that decryption processor.

For those packets that demultiplexer 702 identifies as being unencrypted packets, they are provided to reassembler 708 without requiring any further processing. For those packets that are identified as being encrypted by a native conditional access system, those packets are provided to a decryptor 704, which is able to decrypt those packets using keys available from key storage 706 and provide the decrypted packets to reassembler 708. As explained herein, the common stream is arranged such that packets encrypted for foreign conditional access systems are not needed to produce an accessible system if a decryption processor has at least one native conditional access system providing access to a signal. As explained herein, preferably the packets that are encrypted are at least in part needed by reassembler 708 to produce a useful signal, thereby providing conditional access to the decryption processor conditioned on at least having a key in key storage 706 for decrypting packets encrypted for a native conditional access system. Where different CAs use different encryption algorithms, decryptor 704 should have available to it the decryption algorithms corresponding to the encryption algorithms used by the CAs that are associated with that decryptor's end-user devices.

Figure 11:
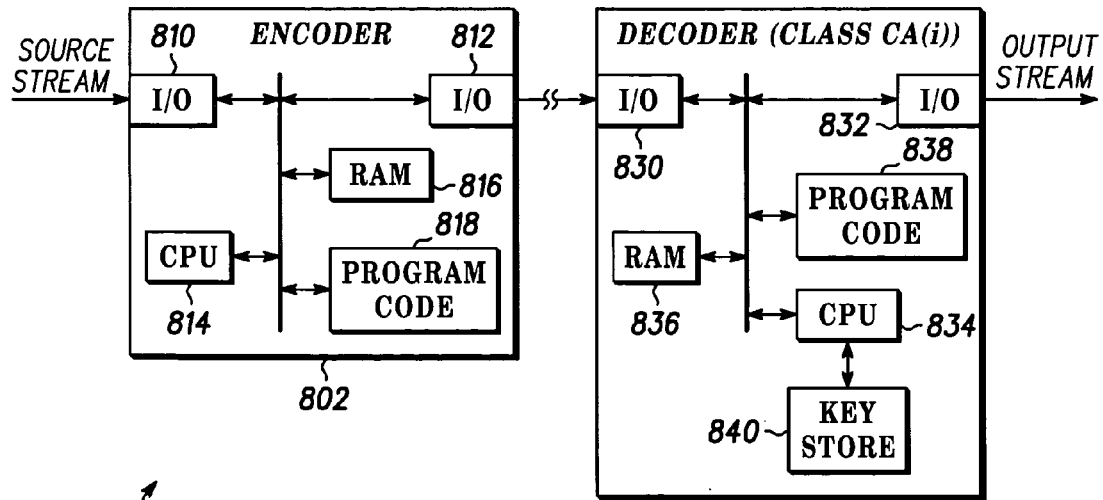
FIG. 11 is a hardware block diagram showing one encoder and one decoder in accordance with an exemplary embodiment of the present invention.

FIG. 11 is a hardware block diagram showing one encoder and one decoder as might be used in a distribution system 800. As shown there, an encoder 802 comprises an input for a source stream, an I/O block 810 for receiving the stream and providing it to other components of encoder 802 and an I/O block 812 for outputting a common stream to other components of distribution system 800 such as a decoder 804(i) for a CA class i. Encoder 802 is also shown including a CPU 814, RAM 816 and program code storage 818. By executing program code stored in program code storage 818, CPU 814 can effect functionality described herein to transform a source stream into a common stream for distribution. Encoder 802 might have other connections and components not shown, such as inputs for keys.

Decoder 804(i) is shown comprising an input for the common stream, an I/O block 830 for receiving the common stream and providing it to other components of decoder 804(i) and an I/O block 832 for outputting a usable signal. Decoder 804(i) is also shown including a CPU 834, RAM 836, program code storage 838 and a key store 840. Key stored 840 might be implemented by a "smart card". By executing program code stored in program code storage 838, CPU 834 can effect functionality described herein to extract and/or transform data from the common stream to for a usable signal if so authorized for the CAS or CASs with which the decoder is authorized. Decoder 804(i) might have other connections and components not shown.

Figure 12:
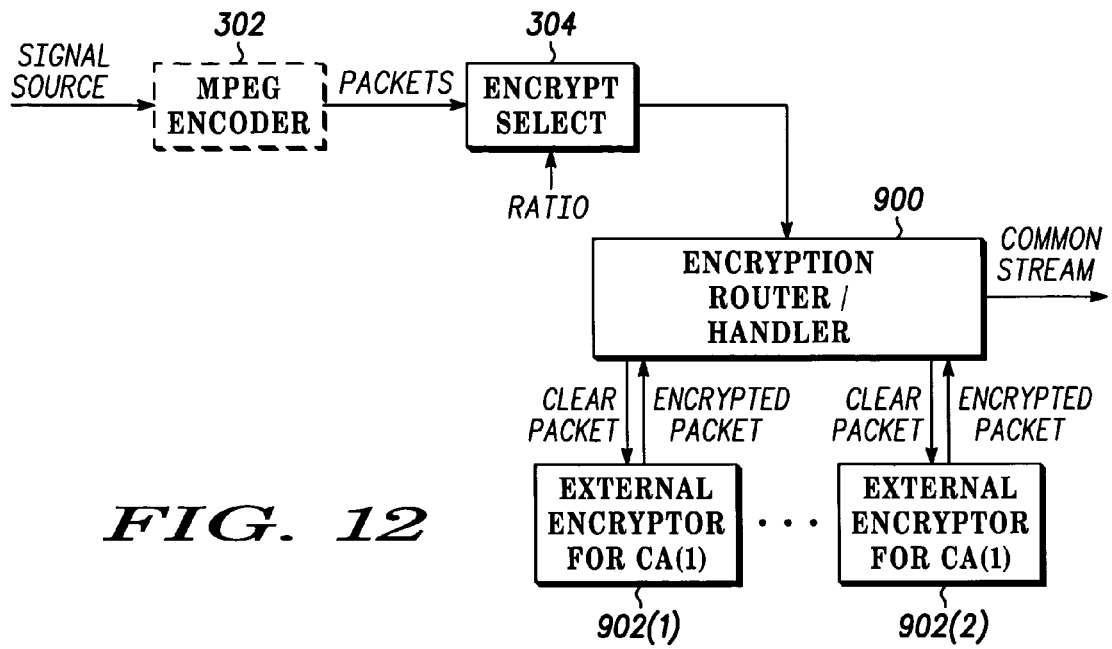
FIG. 12 illustrates a variation of the encryption processor with external encryptors for each conditional access system in accordance with an exemplary embodiment of the present invention.

FIG. 12 illustrates a variation of an encryption processor with external encryptors for each conditional access system. This variation of an encryption processor operates like the one shown in FIGS. 3, 4 or 9, except that instead of having an encryptor, the encryption processor has an encryption router/handler 900 that sends packets to be encrypted out to external encryptors 902 for each class of CAS. That allows each CAS operator to control the encryption process independent of what the distribution system does. Using this approach, each CAS does not have to provide a key to the distribution system, but only has to provide encryption services. In some implementations, some of the CAS would still use the internal encryptor. In other implementations, CASs may provide an encryption module to be executed by the distribution system for encrypting packets for that CAS.

Figure 13:
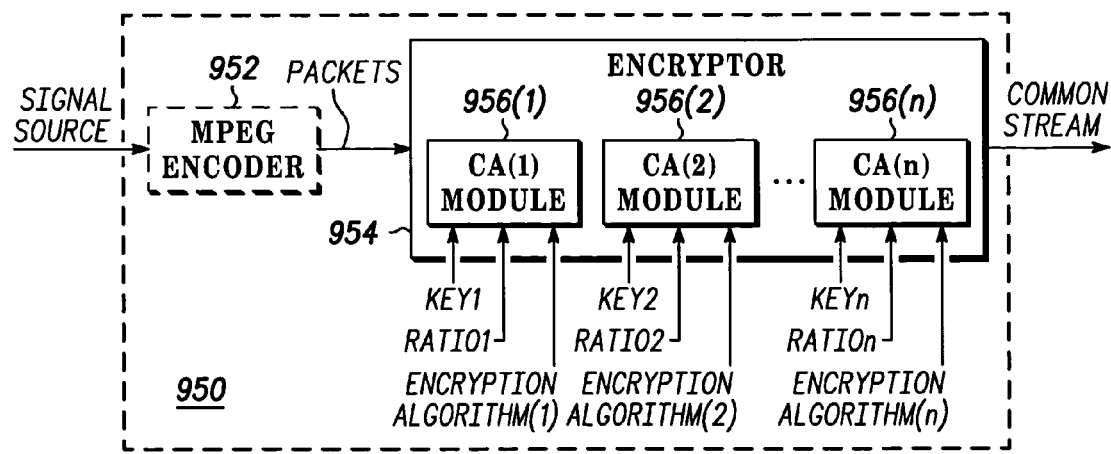
FIG. 13 illustrates a variation of the encryption processor with internal encryption modules for each conditional access system, using distinct encryption algorithms for each conditional access system in accordance with an exemplary embodiment of the present invention.

FIG. 13 illustrates a variation of the encryption processor with internal encryption modules for each conditional access system, possibly using distinct encryption algorithms for each conditional access system. As shown there, an encryption processor system 950 comprises an optional MPEG encoder 952 that feeds packets to an encryptor 954. Within encryptor 954, an encryption module 956 is provided for each conditional access system, such that each conditional access system can use its own keys and its own encryption algorithm. Differing encryption algorithms provide each conditional access system with features to distinguish itself from other conditional access systems, as well as to provide for differing optimizations of the encryption to deal with differing environments.

The above system and method may be implemented by many computer languages commonly known in the art and may operate on many computer platforms which include both volatile and non-volatile memory storage devices. Further, the above-described inventive technique may be implemented on conventional computer readable medium including, but not limited to, diskettes; CD-ROMS; or modulated radio frequency, electromagnetic or optical waves, for example.

Although the invention has been described herein by reference to an exemplary embodiment thereof, it will be understood that such embodiment is susceptible of modification and variation without departing from the inventive concepts disclosed. All such modifications and variations, therefore, are intended to be encompassed within the spirit and scope of the appended claims.

I claim:

1. A method of encoding a common data stream for distribution to a plurality of destination systems, each destination system being authorized to access at least a portion of the common data stream, the method comprising:
    obtaining a source stream;
    identifying a first set of blocks of said source stream as secure blocks;
    identifying a second set of blocks of said source stream as unsecure blocks;
    encrypting said secure blocks using each of a plurality of keys for each of a plurality of classes of destination systems, each key being associated with a corresponding class of destinations systems, thereby forming a plurality of encrypted versions of secured blocks, such that each encrypted version of secured blocks is decryptable by only those destination systems that are in the corresponding class; and
    grouping said unsecured blocks and the plurality of encrypted versions of secured blocks as the common data stream.

2. The method of claim 1, wherein said source stream is packetized video data.

3. The method of claim 1, further comprising encrypting unsecure blocks such that said unsecure blocks are decryptable by each of said plurality of destination systems, if authorized by at least one conditional access system.

4. The method of claim 1, wherein encrypting comprises encryption utilizing at least one of AES, with at least one AES key per class of destination systems, and DES, with at least one DES key per class of destination systems.

5. The method of claim 1, wherein said blocks are MPEG blocks and said secure blocks represent MPEG I frames.

6. The method of claim 1, wherein the first set of blocks and the second set of blocks are identified in accordance with a desired ratio as indicated by a control parameter.

7. A method, in a destination system, of decoding a common data stream distributed to a plurality of destination systems, said method comprising:
    obtaining said common data stream, wherein said common data stream includes a plurality of encrypted versions of secure blocks and unsecure blocks of data, said encrypted versions of secure blocks being encrypted, using each of a plurality of keys, for each of a plurality of classes of destination systems, respectively;
    decrypting only a portion of said encrypted versions of secured blocks that is encrypted using at least one key associated with a class of the destination system, thereby forming decrypted secure blocks; and
    grouping said unsecure blocks and said decrypted secure blocks as a useful stream for use by said destination system.

8. The method of claim 7 further comprising demultiplexing said common data stream into secure and said unsecure blocks.

9. The method of claim 7, wherein decrypting comprises decryption utilizing at least one of AES, with at least one AES key per class of destination systems, and DES, with at least one DES key per class of destination systems.

10. The method of claim 7 further comprising providing at least one decryption key for said step of decrypting.

11. The method of claim 7 further comprising discarding a portion of said encrypted versions of secured blocks that is encrypted using at least one key not associated with the class.

12. The method of claim 7, wherein said blocks are MPEG blocks and said secure blocks represent MPEG I frames.

13. The method of claim 7, wherein the portion of said encrypted versions of secured blocks includes at least one encrypted version of secured blocks among the plurality of encrypted versions of secured blocks.

14. An encoder system for encoding a common data stream for distribution to a plurality of destination systems, each destination system being authorized to access at least a portion of the common data stream, said encoder system comprising:
    an input for receiving a source stream;
    an encoder, said encoder receiving said source stream and packetizing said source stream to provide a plurality of packets; and
    an encryptor for selectively identifying at least one set of blocks of said packets as secure blocks and encrypting said secure blocks, using each of a plurality of keys, for each of a plurality of classes of destination systems, each key being associated with a corresponding class of destination systems, thereby forming a plurality of encrypted versions of secured blocks, such that each encrypted version of secured blocks is decryptable by only those destination systems that are in the corresponding class.

15. The encoder system of claim 14, wherein said encryptor combines said encrypted versions of secured blocks and said unsecure blocks to form a common data stream.

16. The encoder system of claim 14, wherein said encoder is an MPEG encoder.

17. The encoder system of claim 14, wherein said encryptor is at least one of a DES encryptor and an AES encryptor.

18. An encoder system for encoding a common data stream for distribution to a plurality of destination systems, each destination system being authorized to access at least a portion of the common data stream, said encoder system comprising:
    an input for receiving a source stream;
    an encoder, said encoder receiving said source stream and packetizing said source stream to provide a plurality of packets;

encryption selector for selectively identifying at least one set of blocks of said packets as secure blocks; and an encryptor for encrypting said secure blocks, using each of a plurality of keys, for each of a plurality of classes of destination systems, each key being associated with a corresponding class of destination systems, thereby forming a plurality of encrypted versions of secured blocks, such that each encrypted version of secured blocks is decryptable by only those destination systems that are in the corresponding.

19. The encoder system of claim 18, wherein said encryptor combines said encrypted versions of secured blocks and said unsecure blocks to form a common data stream.

20. The encoder system of claim 18, wherein said encoder is an MPEG encoder.

21. The encoder system of claim 18, wherein said encryptor is at least one of a DES encryptor and an AES encryptor.

22. A content transport system, comprising:

a selector for selecting blocks to be encrypted as secured blocks;

a secure block multi-encryptor, for encrypting said secured blocks, using each of a plurality of keys, for each of a plurality of classes of destination systems, each key being associated with a corresponding class of destination systems, thereby forming a plurality of encrypted versions of secured blocks, such that each encrypted version of secured blocks is decryptable by only those destination systems that are in the corresponding class;

a demultiplexer for separating said common stream into blocks that are usable by a destination system and blocks that are not usable by the destination system;

a selective decryptor that decrypts usable version of secured blocks; and a reassembler for reassembling a useful signal stream from any unsecure blocks, and said version of secured blocks decrypted by the selective decryptor, wherein an ability to reassemble the useful signal stream relies in part on an ability to decrypt usable version of secured blocks.

23. The system of claim 22, wherein the reassembler is an MPEG decoder.

24. A computer-readable medium that is a physical memory storage device, the computer-readable medium including a common data stream comprising:

a plurality of secure blocks encoded from a source stream, said plurality of secure blocks encrypted, using each of a plurality of keys, for each of a plurality of classes of destination systems, each key being associated with a corresponding class of destination systems, thereby forming a plurality of encrypted versions of secured blocks, such that each encrypted version of secured blocks is decryptable by only those destination systems that are in the corresponding class; and a plurality of unsedured blocks encoded from said sorce stream.

25. A computer-readable medium that is a physical memory storage device, the computer-readable medium including computer program instructions for distribution to a plurality of destination systems, each destination system being authorized to access at least a portion of the common data stream that instruct a computer to perform the steps of:

obtaining a source stream;

identifying a first set of blocks of said source stream as secure blocks;

identifying a second set of blocks of said source stream as unsecure blocks;

encrypting said secure blocks, using each of a plurality of keys, for each of a plurality of classes of destination systems, each key being associated with a corresponding class of destination systems, thereby forming a plurality of encrypted versions of encrypted secured blocks, such that each encrypted version of secured blocks is decryptable by only those destination systems that are in the corresponding class; and grouping said unsecured blocks and the plurality of encrypted versions of secured blocks as the common data stream.

26. A computer-readable medium that is a physical memory storage device in a destination system, the computer-readable medium including computer program instructions for decoding a common data stream distributed to a plurality of destination systems, that instruct a computer to perform the steps of:

obtaining said common data stream, wherein said common data stream includes a plurality of encrypted versions of secure blocks and unsecure blocks of data, said encrypted versions of secure blocks being encrypted, using each of a plurality of keys, for each of a plurality of classes of destination systems, respectively;

decrypting only a portion of said encrypted version of secured blocks that is encrypted using at least one key associated with a class of the destination systems, thereby forming decrypted secure blocks; and grouping said unsecure blocks and said decrypted secure blocks as a useful stream for use by said destination system.

* * * * *